United States Patent [19]

Lambert

[11] 4,038,119
[45] July 26, 1977

[54] BEAD FORMING APPARATUS AND METHOD

[76] Inventor: Everette M. Lambert, 3380 Edward Ave., Santa Clara, Calif. 95050

[21] Appl. No.: 637,260

[22] Filed: Dec. 3, 1975

[51] Int. Cl.² .......................................... B32B 31/00
[52] U.S. Cl. ...................................... 156/163; 4/172;
156/222; 156/245; 156/267; 156/306; 156/500;
156/583; 264/229; 264/248; 425/500; 428/66;
428/192
[58] Field of Search ................. 156/88, 196, 216, 160,
156/163, 221, 222, 223, 267, 306, 475, 583, 312,
281, 535, 580, 581, 245, 500; 428/66, 81, 157,
192; 264/248, 299, 229; 219/243; 4/172, 172.19,
177; 425/500, 520

[56] References Cited

U.S. PATENT DOCUMENTS

| 1,642,847 | 9/1927 | Emanuele | 156/163 |
| 2,804,419 | 8/1957 | De Woskin et al. | 156/267 |
| 3,066,064 | 11/1962 | Pommer | 156/306 |
| 3,177,501 | 4/1965 | Kwake | 4/172 |
| 3,283,052 | 11/1966 | Munk | 264/248 |

Primary Examiner—William A. Powell
Assistant Examiner—J. J. Gallagher
Attorney, Agent, or Firm—Townsend and Townsend

[57] ABSTRACT

Apparatus and method for forming a bead on the border of a swimming pool liner or similar article of plastic sheet material. The plastic sheet is located so that a portion of the border thereof underlies the elongate heat sealing member of a heat sealing apparatus. An elongate strip of bead material is dispensed beneath the heat sealing member and underneath the border of the plastic sheet underlying the member so that the border overlaps the strip. The outer edge of the bead material is compressed by engaging it with a transverse moving member adjacent the edge of the border to provide curvature to the material. The heat sealing member is then motivated downwardly into contact with the portion of the border of the plastic sheet underlying the member to heat seal the border to the bead material. The curvature of the bead material provides excess sheet material where the heat sealing takes place to minimize the formation of a tear line between the bead material and the plastic sheet.

7 Claims, 10 Drawing Figures

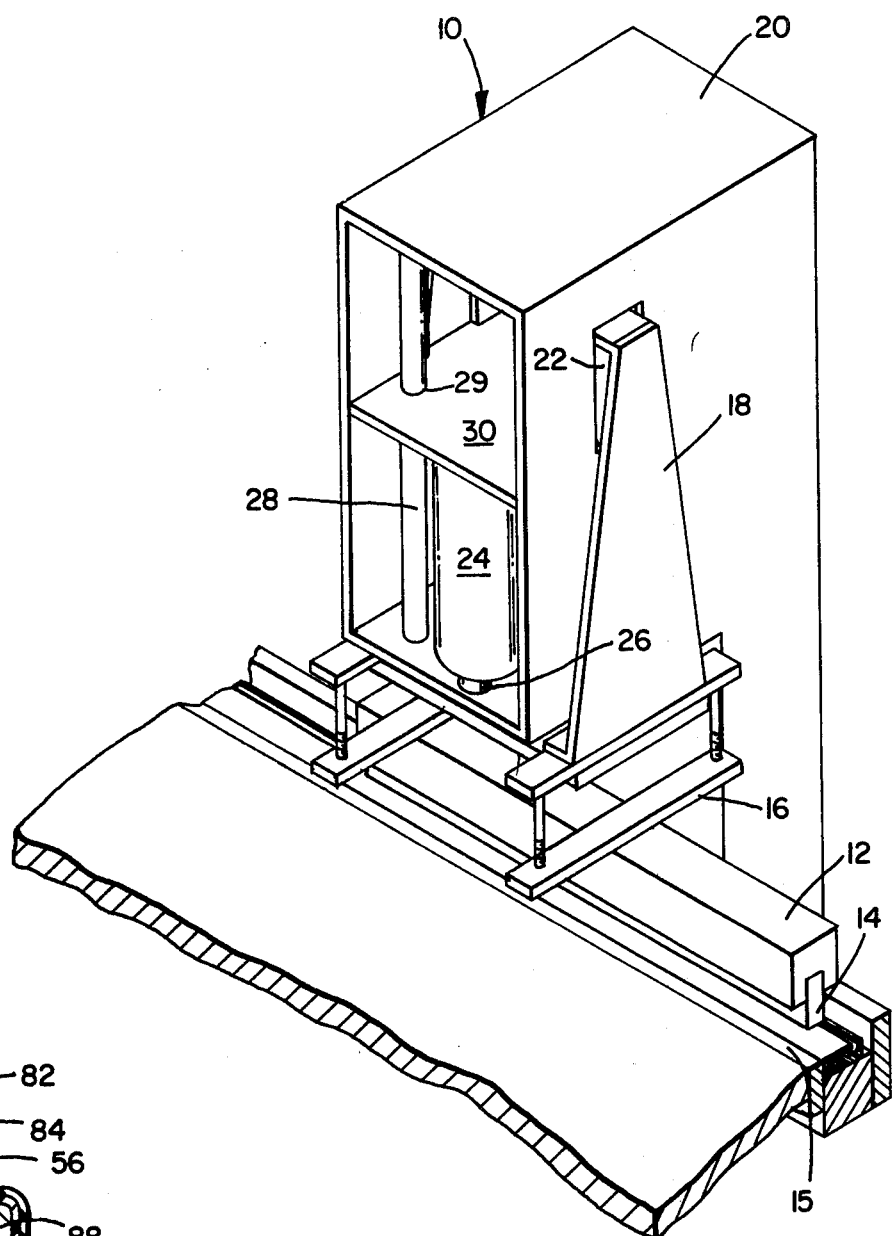
FIG_1
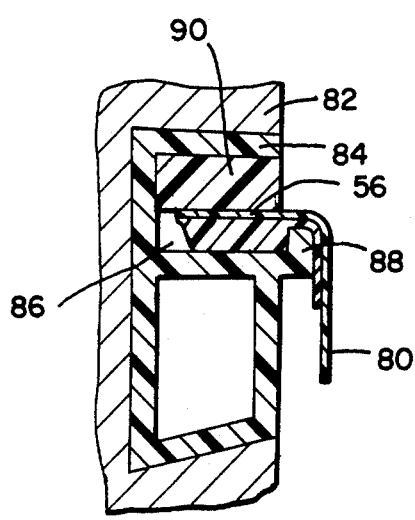
FIG_8
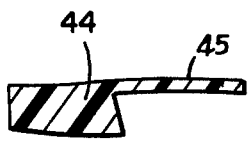
FIG_6
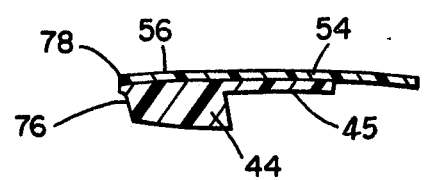
FIG_7

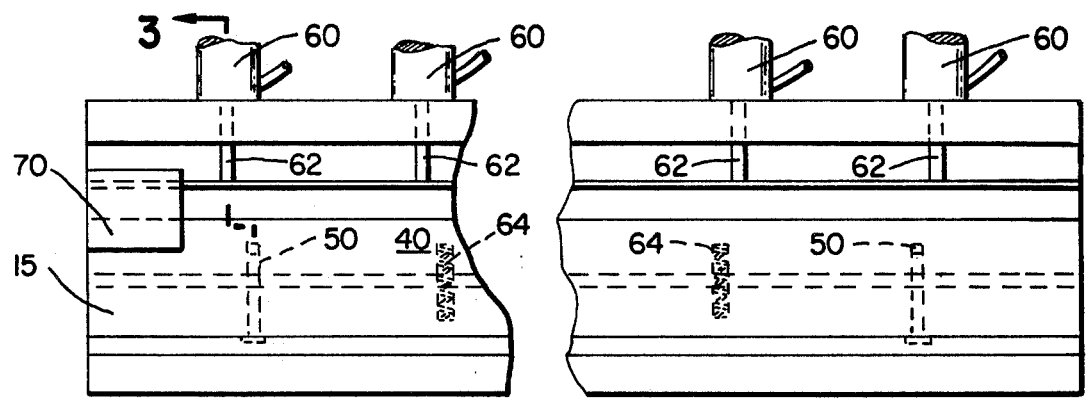
FIG_2
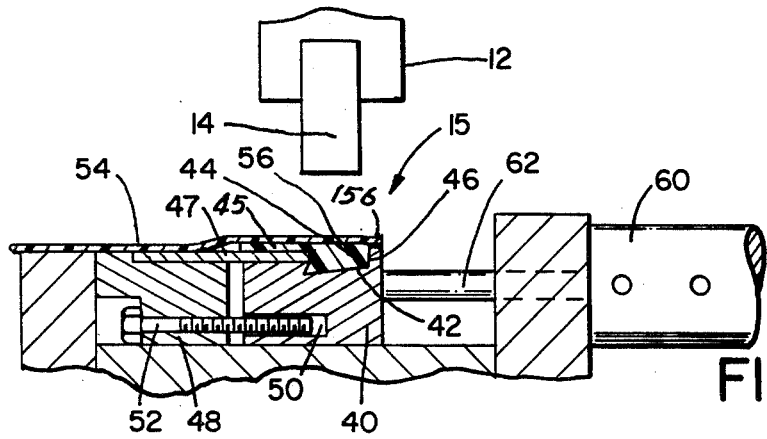
FIG_3
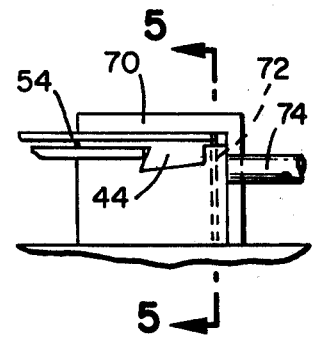
FIG_4
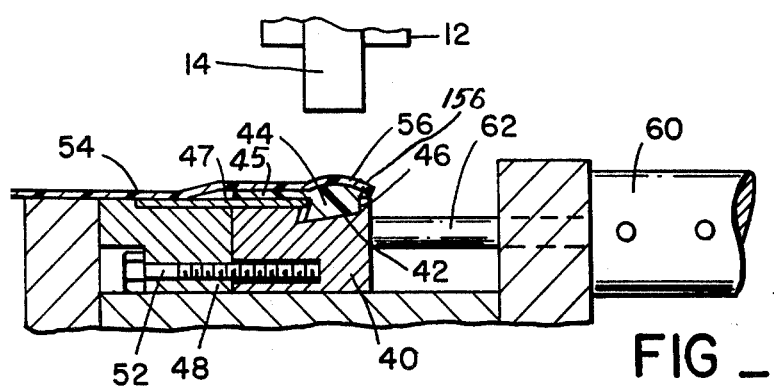
FIG_3A
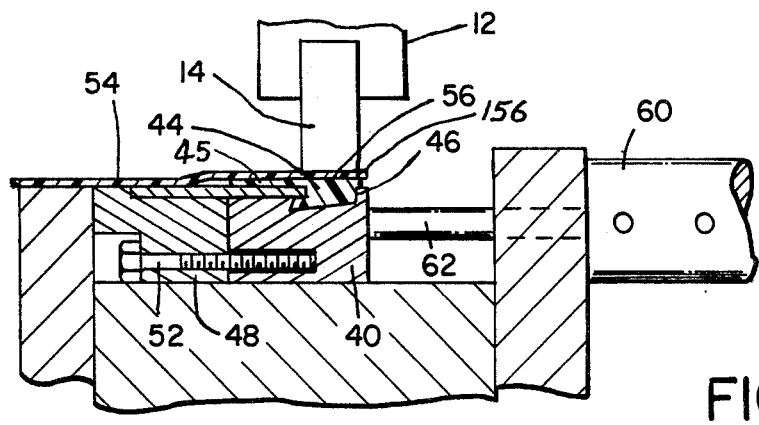
FIG_3B
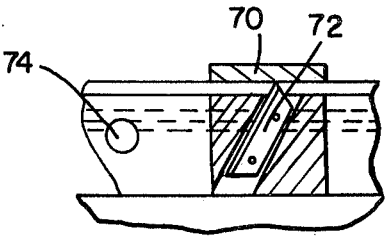
FIG_5

BEAD FORMING APPARATUS AND METHOD

BACKGROUND OF THE INVENTION

The present invention relates to apparatus and method for forming a bead on the border of a swimming pool liner or similar article of plastic sheet material.

Many swimming pools located partially or totally above ground comprise a plastic liner which is suspended from a frame circumscribing the pool. To facilitate mounting the swimming pool liner to the frame, the liner is provided with a bead along its border which engages a corresponding slot in the frame. After the bead has been so inserted it is locked in position by a spacer which is forced into the slot over the border of the sheet material including the bead.

The bead is ordinarily fabricated into the border of the plastic sheet material forming the swimming pool liner by heat sealing an additional strip of bead forming material to the border. However, when two pieces of plastic material are heat sealed together, weak spots are formed on the two sides of the heat sealed seam. This is a particular problem with the inside edge of the seam because the liner is suspended from the bead and large stresses are exerted on the sheet material where it is connected to the bead. These large stresses are focused at the weak spot formed on the inside edge of the seam. As a result, the bead material can become separated from the liner at this point and fail prematurely. In the past this problem has appeared endemic to heat sealing processes and the resultant weak point in the swimming pool construction has been merely accepted as a difficulty inherent in such construction.

SUMMARY OF THE INVENTION

The present invention provides apparatus and method for forming a bead on the border of a swimming pool liner or similar article of plastic sheet material so as to minimize the formation of a tear line between the bead material and the plastic sheet at the outer edge of the sheet. The plastic sheet is located so that a portion of the border thereof underlies the elongate heat sealing member of a heat sealing apparatus. An elongate strip of bead material is dispensed beneath the heat sealing member and underneath the border of the plastic sheet underlying the member so that the border overlaps the strip. The bead material is compressed adjacent the edge of the border by engaging the bead material with a transversely moving member to provide upward curvature to the upper surface of the bead material over which the sheet material is draped. The heat sealing member is then motivated downwardly into contact with the portion of the border of the plastic sheet underlying the heat sealing member to heat seal the border to the bead material.

The compression exerted on the bead material as the heat sealing operation is taking place flattens out the curvature in the bead material. Excess sheet material is provided where the bead material was formerly curved. The excess sheet material minimizes the formation of a tear line between the bead material and the plastic sheet at the edges of the heat sealed seam. As a result, the bead material will not tend to separate from the plastic sheet at the inside edge of the seam to prevent premature failure of the swimming pool construction where the liner is joined to the frame.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of the apparatus of the present invention;

FIG. 2 is a plan view of the working bed of the apparatus illustrated in FIG. 1;

FIG. 3 is a cross sectional view taken along lines 3—3 of FIG. 2 prior to actuation of the die;

FIG. 3A is a view similar to that of FIG. 3 after movement of the die to compress the bead material;

FIG. 3B is a view similar to those of FIGS. 3 and 3A showing the heat sealing member in the heat sealing position;

FIG. 4 is an elevation view of the cutting apparatus of the present invention;

FIG. 5 is a cross sectional view taken along lines 5—5 of FIG. 4;

FIG. 6 is a cross sectional view of the strip of bead material;

FIG. 7 is a cross sectional view of the strip of bead material attached to the border of the swimming pool liner;

FIG. 8 is a cross sectional view illustrating the use of the bead at the edge of the swimming pool liner to attach the liner to a frame.

DESCRIPTION OF THE PREFERRED EMBODIMENT

The apparatus of the present invention is illustrated in general by way of reference to the perspective view of FIG. 1. Heat sealing apparatus 10 includes an elongate heat sealing member 12 having a depending portion 14 adapted to contact and seal two pieces of heat sealable material located on working bed 15. Heat sealing member 12 is located on the underside of frame 16 which depends from an A-frame 18 supported within housing 20. Apertures 22 are formed on either side of housing 20 and allow for vertical movement of A-frame 18 to control the vertical position of heat sealing member 12. Housing member 20 is broken away at its forward end to reveal hydraulic piston 24 having a depending shaft 26 which engages structure 16 to control vertical movement thereof. Alignment of heat sealing member 12 is maintained by shafts 28 which pass through apertures 29 in the platform 30 supporting hydraulic piston 24 and interconnect A-frame 18 with structure 16.

The working bed 15 of the apparatus of the present invention is illustrated in more detail by way of reference to FIGS. 2 and 3 in combination. Working bed 15 includes a die 40 which has an upwardly opening cavity 42 underlying heat sealing member 12. Cavity 42 is conformed to the shape of a strip 44 of bead material (See FIG. 6), and has a depressed lip 46 adjacent the outer edge of bead material 44. The bead material 44 also includes a lateral tongue 45 of plastic material along its inner edge for overlying a portion of the die 40. Working bed 15 further includes a fixed portion 48 adjacent die 40 and a planar member 47 attached to the fixed portion and overlying a portion of die 40. Die 40 has a plurality of transverse slots 50, and bolts 52 pass through the fixed portion 48 of working bed 15 and engage slots 50.

As illustrated in FIG. 3, a strip of bead material 44 is dispensed onto working bed 15 beneath heat sealing member 12 in cavity 42 of die 40. Also, a piece of plastic sheet material 54 is located so that a portion of the border 56 thereof is located beneath heat sealing member 12 and overlaps bead material 44.

With bead material 44 and the border 56 of sheet material 54 in position underneath heat sealing member 12, hydraulic actuators 60 are actuated to extend shafts 62 thereof and move die 40 transversely with respect to the pieces of material as illustrated in FIG. 3A. Pins 52 maintain alignment of die 40 as it is being moved and limit the distance through which the die is permitted to move. During such movement, the depressed lip 46 of die 40 compresses the bead material 44 to provide curvature to the upper surface of the bead material. The border 56 of sheet material 54 is draped over the curved upper surface of bead material 44 leaving an excess 156 on the border 56, as illustrated in FIG. 3A.

After bead material 44 is compressed, heat sealing member 12 is moved downwardly into contact with border 56 of sheet material 54 overlying the bead material, as illustrated in FIG. 3B. The depending portion 14 of member 12 flattens out bead material 44, fusing the bead material 44 to the sheet material 54, the pressure and resultant fusion temperature causing the bead material to be extruded through the die 40, leaving excess sheet material 45 and 156 at the edges of the heat sealing member 12. The heat sealing member 12 firmly holds the bead material 44 and the sheet material 54 together during the binding operation. This excess sheet material 156 minimizes the formation of a tear line where the sheet material 54 is joined to the bead. After the materials 44 and 54 have been heat sealed together, hydraulic cylinder 60 is deactivated and shafts 62 are withdrawn to their previous position. Die 40 is returned to its initial position by springs 64 which were compressed when the die was moved transversely.

After bead material 44 has been heat sealed with plastic sheet material 54, the joined pieces of material are drawn off the working bed beneath overlying plate 70. As illustrated in FIGS. 4 and 5, a cutting blade 72 is provided underlying plate 70. The lateral position of cutting blade 72 is controlled by shaft 74 so that the cutting blade is positioned adjacent the outer edge of the joined pieces of material 44, 54. Cutting blade 72 slices off the outer edge of the joined pieces of material to trim the outer edge of the bead.

The configuration of the bead formed by bead material 44 at the border 56 of sheet material 54 is illustrated in FIG. 7. An indentation 76 is formed by the compression exerted by the movement of the die due to the fact that the lip 46 of die 40 is depressed. The depressed lip of the die has been found to be desirable to increase the curvature of the bead material when compression is exerted.

The use of the beaded material for attachment of a swimming pool liner 80 to a frame 82 is illustrated in FIG. 8. Frame 82 includes an embedded plastic section 84 which forms a cavity 86. The beaded border 56 of the swimming pool cover 80 can be inserted in cavity 86 so that it engages the lip portion 88 of cavity 86. After the beaded border 56 is so inserted, a spacer 90 can be inserted in cavity 86 to maintain the beaded border in position.

While a preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims.

What I claim as new is:

1. A method for fabricating uniform plastic bead along the margin of a sheet of like plastic material to form a swimming pool liner or like article supportable by said bead, said method comprising the steps of:
   inserting an elongate strip of plastic bead material into a cavity defined by an elongate die generally conforming to the shape of said bead material;
   overlaying said bead material with a margin of a like plastic sheet material to overlap said die cavity with a margin of excess sheet material;
   laterally compressing said bead material in said die to create a convex curvature of bead material in abutting relationship to said sheet material;
   compressing said sheet material against said bead material transverse of said die compressions; and
   fusing said sheet material into said bead material to establish a heat sealed bead of homogeneous plastic material for minimizing the formation of a tear line along the junction of said bead material and said sheet material.

2. A method according to claim 1, wherein said bead material includes a lateral tongue for underlying said sheet material, and wherein said overlaying step includes overlaying said sheet material to abut said tongue.

3. A method according to claim 2, wherein said sheet material is compressed against said bead material by a heat sealing member having a lateral dimension less than the lateral dimension of the bead material uncompressed by said die.

4. A method according to claim 3, wherein said fusing step includes at least partially melting said bead material for molding a portion of said bead material to the shape of said die.

5. An apparatus for forming a uniform plastic bead along a margin of a like plastic sheet material, said apparatus comprising:
   a working bed for supporting said sheet material;
   means for forming a heat seal, said seal forming means comprising an elongate member and means for moving said elongate member transversely relative to said working bed;
   an elongate die defining an upwardly opening cavity for gripping said bead of said plastic material below and overlying a plastic sheet disposed upon said working bed, said die comprising a fixed member, and opposing laterally movable member, and means for guiding said movable member for laterally expanding and contracting said head gripping cavity, said fixed member having a lip depressed relative to said opposing movable member, and said movable member having a laterally inwardly extending shoulder for engaging a portion of said bead material opposing said depressed lip;
   said die being compressible upon said bead material to induce an upward curvature; and
   said elongate member being transversely movable along said die for compressing said overlying sheet material against said bead material and for fusing said bead material and said sheet material into a fused bead which conforms to the shape of said die cavity.

6. An apparatus according to claim 5, further including means for trimming excess sheet material along the outer margin of said bead material.

7. Apparatus according to claim 5, wherein said elongate member is narrower than said uncompressed bead material for leaving an excess of unfused sheet material adjacent both sides of said fused bead for avoiding the formation of a tear line along the border of the plastic sheet adjacent said fused bead.

* * * * *